(12) United States Patent
Cuzzocrea

(10) Patent No.: US 6,575,414 B2
(45) Date of Patent: Jun. 10, 2003

(54) BED LIFTING SYSTEM

(76) Inventor: Lawrence A. Cuzzocrea, 3502 E. Vineyard Rd., Phoenix, AZ (US) 85040

( * ) Notice: Subject to any disclaimer, the term of this patent is extended or adjusted under 35 U.S.C. 154(b) by 0 days.

(21) Appl. No.: 09/766,732

(22) Filed: Jan. 22, 2001

(65) Prior Publication Data

US 2002/0139907 A1 Oct. 3, 2002

(51) Int. Cl.$^7$ ............................................. F16M 11/24
(52) U.S. Cl. ............................. 248/188.2; 248/346.11; 297/463.1; 5/509.1
(58) Field of Search ........................ 248/188.1, 188.2, 248/346.11; 5/509.1; 297/463.1, 344.12

(56) References Cited

U.S. PATENT DOCUMENTS

| | | | | |
|---|---|---|---|---|
| 1,915,320 A | * | 6/1933 | Jones | 248/188.2 |
| 2,072,791 A | * | 3/1937 | Baer | 248/407 |
| 2,893,164 A | * | 7/1959 | Martin | 248/188.2 |
| 2,933,850 A | * | 4/1960 | Martin | 248/188.2 |
| 3,993,275 A | * | 11/1976 | Lucas | 248/188.2 |
| D253,562 S | * | 12/1979 | Evans | D6/468 |
| 5,224,227 A | * | 7/1993 | McGinley | 5/509.1 |
| D338,360 S | * | 8/1993 | Petersen | D6/491 |
| 5,345,631 A | * | 9/1994 | Saperstein et al. | 5/509.1 |
| 5,615,429 A | * | 4/1997 | Williams | 5/509.1 |
| 5,683,283 A | * | 11/1997 | Glynn | 446/128 |
| 6,012,185 A | * | 1/2000 | Woods et al. | 5/509.1 |
| 6,186,856 B1 | * | 2/2001 | Chen | 446/128 |
| D455,335 S | * | 4/2002 | Cort | D8/374 |
| 2002/0079411 A1 | * | 6/2002 | Pricope | 248/188.2 |
| 2002/0093237 A1 | * | 7/2002 | Martin | 297/463.1 |

OTHER PUBLICATIONS

Patent application (abandoned) 09/965,572, Bed Elevator for Supporting a Leg of a Bed at Variable Heights. Inventors Nick Lally and Peter Heavener.*

* cited by examiner

Primary Examiner—Leslie A. Braun
Assistant Examiner—Deborah M. Brann
(74) Attorney, Agent, or Firm—Martin L. Stoneman

(57) ABSTRACT

A bed lifting system utilizing a unitary block having bed leg receiving cavities, each of different depth, on reversable top and bottom sides of the block. One of these sides has four round cylindrical bore holes for stably supporting a bed leg (with or without a small wheel) at each of four different elevations. The other side has four cavities shaped to support a large bed leg wheel at each of four elevations. Extension blocks are provided for fitting over the unitary block to further raise the bed leg.

20 Claims, 5 Drawing Sheets

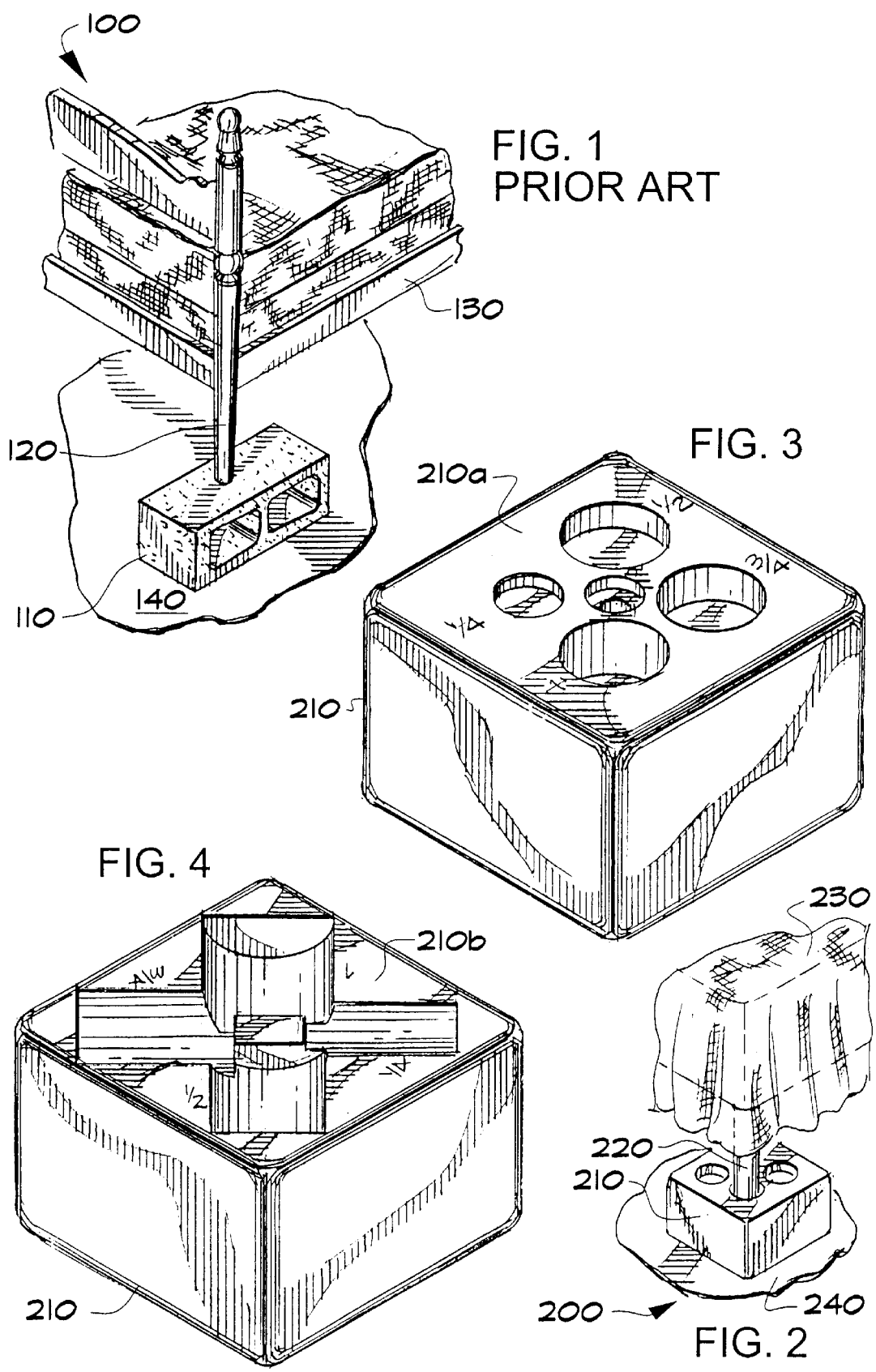

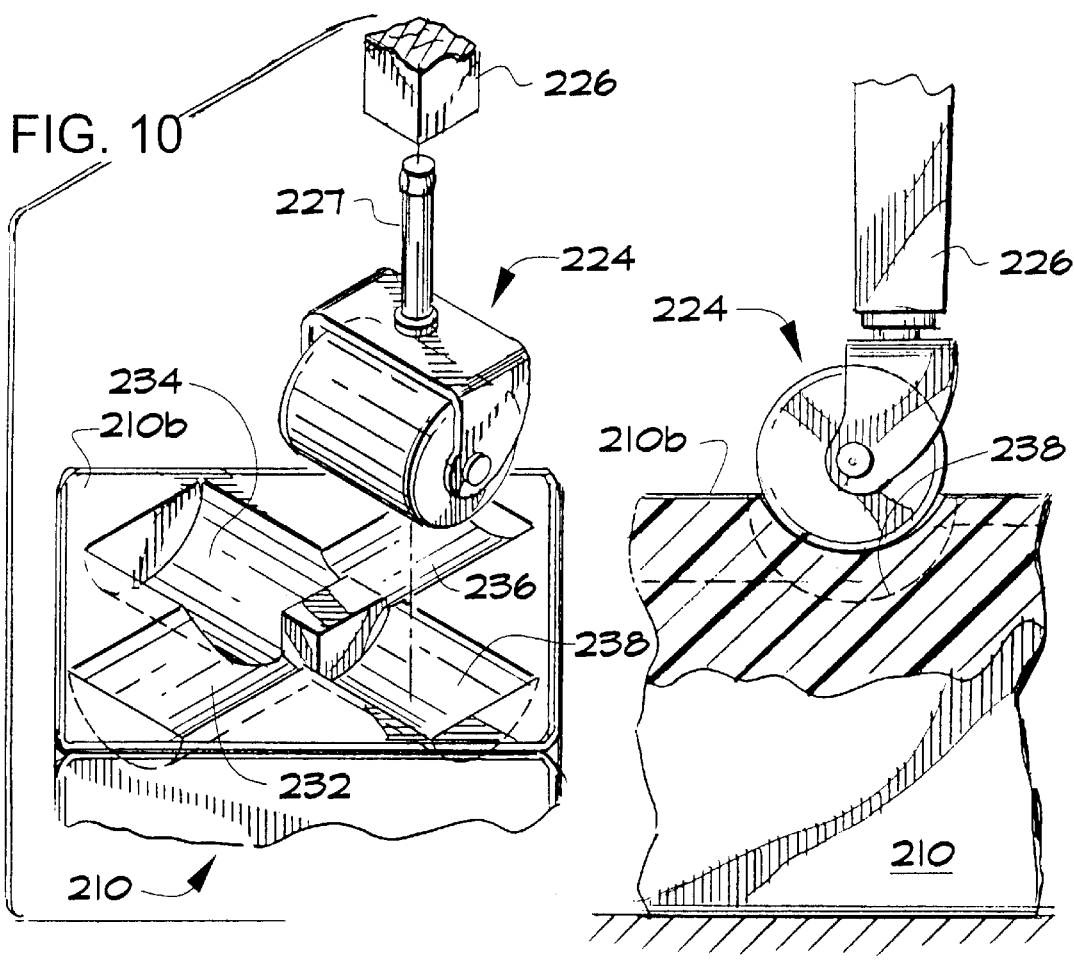
FIG. 10
FIG. 11
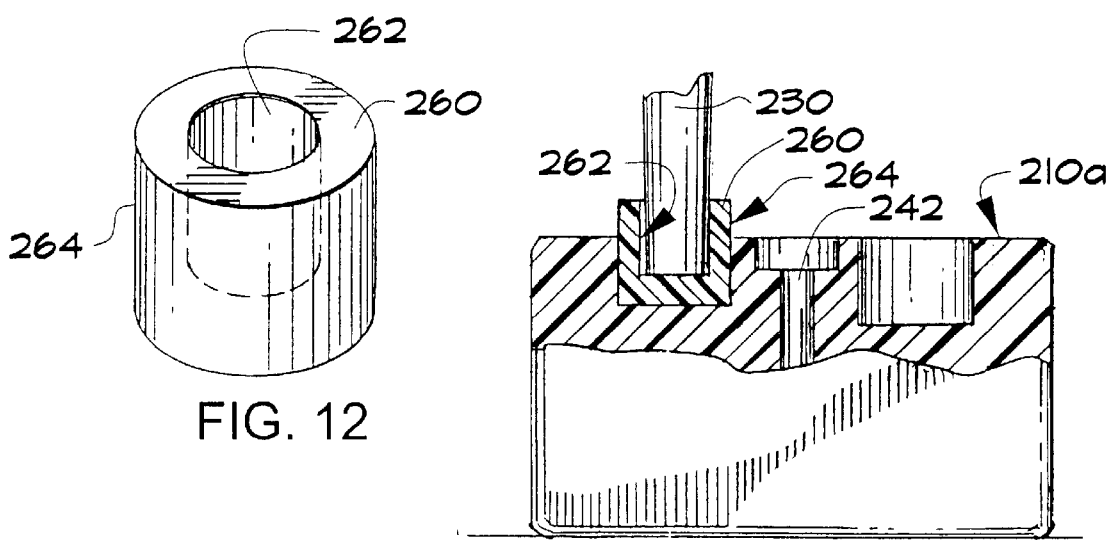
FIG. 12
FIG. 13

BED LIFTING SYSTEM

BACKGROUND

This invention relates to bed lifting systems, and more specifically, to a bed lifting system enabling a selectable-height elevation of a bed support leg inserted therein.

Many people would like to raise the elevation of their bed for many reasons, e.g., stowing of lockers or other storage beneath the bed or to better fit desired bed coverings. Also, the elevation of a bed's foot, head, or both has been shown to have positive health results in many cases. For example, raising the foot of a bed is directed by physicians to alleviate discomfort or assist in the treatment of conditions related to varicose veins and phlebitis. While elevating the head of the bed alleviates discomfort or assists in the treatment of conditions related to hiatal hernias, respiratory difficulties, gastro-esophageal reflux disorder, congestive heart failure, etc. Additionally, raising the entire bed level provides assistance to the elderly or infirm in getting into and out of bed, and also eases the effort required for the care of someone in the bed. While hospital beds allow the selective elevation of the foot, the head, or the entire bed, few private individuals can afford or justify the expense of a hospital style bed equipped with motors, electronic controls etc. Thus, most individuals turn to crude makeshift methods to elevate the bed as desired. For example, referring to FIG. 1, a prior art system (Prior Art 100, hereinafter), as would be typical in a private home, for elevating a bed leg is shown. The prior art 100 comprises a concrete block 110. The concrete block 110 is placed beneath a leg 120 of a bed 130. Although not shown herein, additional blocks 110 may be placed beneath other legs of the bed 130 in order to either raise one end of the bed 130 or to raise the entire bed 130. The difficulties with the use of such makeshift systems as the concrete block 110, is that only one height is available due to the open cavities of the remaining horizontal axis of the concrete block. Also, the height increase available from a concrete block 110 is fairly large and in some cases may exceed the elevation increase actually desired. Additionally, the leg 120 may become dislodged from the surface of the block 110 if a person bumps the edge of the bed 130. Furthermore, this problem becomes even more exacerbated if the leg 120 comprises a wheel, roller, or caster mechanism at the bottom of the leg 120 resting upon the block 110 (not shown herein) in which an unstable situation exists. Yet another problem with using such items as concrete blocks is that the surface of the concrete block 110 is extremely abrasive, thus causing damage to the surface of the flooring 140 beneath the concrete block 110. Therefore, a need exists for an improved system of elevating beds that is inexpensive to implement and efficient. Another need exists for an improved system of elevating beds that would enable selective levels of elevation of either one end of a bed, or of the entire bed. A further need exists for an improved system of elevating beds that would be stable for a variety of bed legs including peg feet, and various types of wheels and casters. Yet another need exists for an improved system of elevating beds that would not result in damage to the finish of the flooring surface beneath the system, nor to the bed leg upon the system.

OBJECTS OF THE INVENTION

It is an object and feature of the present invention to provide an improved system of elevating beds. It is another object and feature of the present invention to provide an improved system of elevating beds that would enable selective levels of elevation of either one end of a bed or of the entire bed. It is a further object and feature of the present invention to provide an improved system of elevating beds that would be stable for a variety of bed legs including peg feet, and various types of wheels and casters.

A further primary object and feature of the present invention is to provide such a system which is efficient, inexpensive, and handy. Other objects and features of this invention will become apparent with reference to the following descriptions.

SUMMARY OF THE INVENTION

According to a preferred embodiment of the present invention, this invention provides a bed lifting system for elevating a bed leg to a selectable height above a floor comprising, in combination: a unitary lifter, having opposed top and bottom ends, structured and arranged to support the bed leg in a raised position above the floor; and a first plurality of respective holders structured and arranged to hold the bed leg in a stable position at a first plurality of respective unique selected heights; wherein such first plurality of holders comprises such unitary lifter. It also provides such a system wherein a first such opposed end of such unitary lifter comprises such first plurality of holders. Further, provides such a system further comprising: a second plurality of respective holders structured and arranged to hold the bed leg in a stable position at a second plurality of respective unique selected heights; wherein a second such opposed end of such unitary lifter comprises such second plurality of holders; and wherein such opposed ends of such unitary lifter may be reversely placed so that either such opposed end may act as a bottom support.

Additionally, it provides such a system wherein each respective one of such first plurality of holders is opposedly aligned with a selected respective one of such second plurality of holders, selected in such manner as to substantially maximize structural integrity of such unitary lifter. And, it provides such a system wherein: each respective one of such first plurality of holders comprises a respective first cavity shaped substantially like a round cylinder; and each one of such respective first cavities has a different bore depth than each other one of such respective first cavities.

Furthermore, it provides such a system wherein: each respective one of such second plurality of holders comprises a respective second cavity shaped substantially like a side portion of a round cylinder; and each one of such respective second cavities has a different depth than each other one of such respective second cavities. Also, it provides such a system further comprising: at least one auxiliary lifter structured and arranged to be supported by such unitary lifter and to support such bed leg in a further raised position.

According to another preferred embodiment of the present invention, this invention provides a bed lifting system having a plurality of receiving surfaces and bed leg receiving cavities, comprising, in combination: at least one bed leg lifting block; a first receiving surface integral to a first side of such bed leg lifting block; and a first plurality of bed leg receiving cavities integral to such first receiving surface; wherein each of such first plurality of bed leg receiving cavities comprises a unique depth from such first receiving surface. Moreover, it provides such a system further comprising: a second receiving surface integral to a second side, opposite such first side, of such bed leg lifting block; and a second plurality of bed leg receiving cavities integral to such second receiving surface; wherein each of such second plurality of bed leg receiving cavities comprises a unique depth from such second receiving surface. It also provides such a system wherein such first plurality of cavities comprises substantially different geometries from such second plurality of cavities. And, it provides such a system wherein each of such second plurality of bed leg receiving cavities comprises a reverse partial cylinder structured and arranged to stably support the bottom of a bed roller wheel.

Even further, it provides such a system wherein each of such first plurality of bed leg receiving cavities comprises a round cylindrical bore hole. And further, it provides such a system further comprising at least one bushing structured and arranged so that an outer diameter of such bushing comprises a friction fit into at least one such round cylindrical bore hole. Still further, it provides such a system wherein each such bore hole comprises a wheel-receiving groove running laterally across a bottom end of such bore hole. Also, it provides such a system further comprising at least one extension block structured and arranged to stably support the bed leg on a first block surface and to be stably supported on an opposed second block surface by one such bed lifting block.

Additionally, it provides such a system wherein: such extension block comprises a plurality of protrusions upon such first block surface of such extension block; and such plurality of such protrusions are configured so as to mate substantially surface-to-surface with such first plurality of bed leg receiving cavities integral to such first receiving surface. And, it provides such a system wherein such extension block has a dimension, between such first block surface of such extension block and such second opposed block surface, which is less then a corresponding measured dimension between such first side and such second side of such bed lifting block. Further, it provides such a system wherein such extension block has a dimension, between such first block surface of such extension block and such second opposed block surface of such extension block, wherein such dimension is greater then a corresponding measured dimension between such first side and such second side of such bed lifting block.

Moreover, it provides such a system wherein: such extension block comprises a male attachment structure extending from at least one surface of such extension block; such bed lifting block comprises at least one female attachment structure on at least one surface of such bed lifting block; and such male attachment structure and such female attachment structure are structured and arranged to provide, when connected, a substantially secure connection between such extension block and such bed lifting block. And, it also provides such a system wherein each of such second plurality of cavities comprises a wheel-receiving groove running laterally across a bottom end of such cavity, each such wheel-receiving groove being aligned so that an extension of such wheel-receiving groove would pass through a center point of such second side.

BRIEF DESCRIPTION OF THE DRAWINGS

FIG. 1 is a perspective view of a prior art system for elevating a bed leg comprising a concrete block placed beneath a bed leg.

FIG. 2 is a perspective drawing showing a peg foot style bed leg positioned upon and elevated by an embodiment of the present invention, a bed lifting system.

FIG. 3 is a perspective view of the embodiment of the present invention of FIG. 2, a bed lifting system, with a first bed leg receiving surface facing upwards.

FIG. 4 is a perspective view of the embodiment of the present invention of FIG. 2, a bed lifting system, with a second bed leg receiving surface facing upwards.

FIG. 10 is a perspective view of the embodiment of the present invention of FIG. 4, viewed from a position 90° counterclockwise relative to the view of FIG. 4., a bed lifting system, with a second receiving surface facing upwards, showing a roller wheel bed leg positioned over a reverse half cylinder integral to the second receiving surface.

FIG. 11 is an elevational cut-away view of the embodiment of the present invention of FIG. 8 showing the roller wheel bed leg positioned into the reverse half cylinder integral to the second receiving surface.

FIG. 12 is a perspective view of another embodiment of the present invention comprising a bushing used to adapt and couple a peg foot style bed leg to a bore hole integral to the first bed leg receiving surface.

FIG. 13 is an elevational cut-away view showing the bushing placed upon a small size peg foot style bed leg, with the bushing in turn inserted into the smallest bore hole integral to the first bed leg receiving surface.

Figure 5:
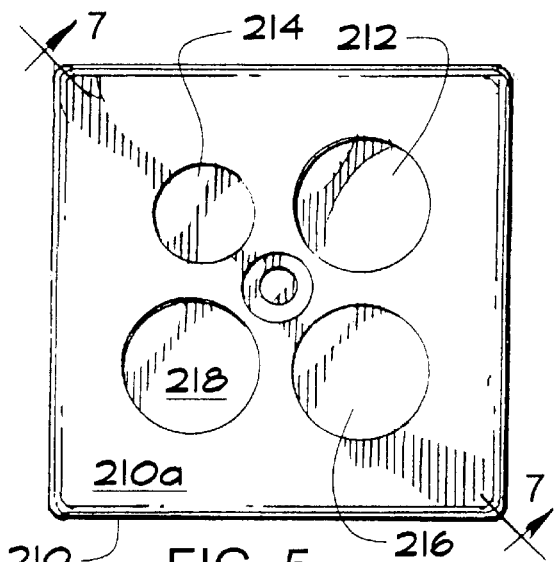
FIG. 5 is an overhead view of the first bed leg receiving surface of the embodiment of the present invention of FIG. 3.

19, showing the wheeled bed leg positioned into the groove in the bottom of the bore hole integral to the alternative bed leg receiving surface.

DETAILED DESCRIPTION OF A PREFERRED EMBODIMENT OF THE INVENTION

Referring to FIG. 2, a perspective drawing showing a peg foot style bed leg, positioned upon and elevated by an embodiment of the present invention, a bed lifting system is shown (the "system 200" hereinafter). A preferred embodiment of the system 200 comprises a block like device, (the bed leg lifting block 210 hereinafter) having substantially equal length sides.) Preferably, the bed leg lifting block 210 (embodying herein a unitary lifter, having opposed top and bottom ends, structured and arranged to support the bed leg in a raised position above the floor) is placed beneath a bed 230 to elevate the bed 230. More specifically, the bed leg lifting block 210 is placed between a bed leg 220, and its supporting surface 240. Although not shown herein, the system 200 may provide up to six bed leg lifting blocks 210, each placed beneath a separate bed leg 220 of the bed 230. As each of these bed leg lifting blocks 210 are substantially identical, only one bed leg lifting blocks 210 is shown and described. Those skilled in the art will recognize that two bed leg lifting blocks 210 may be used to elevate a bed 230 at a slant, or that four bed leg lifting blocks 210 may be used to elevate the entire bed 230. Therefore, the following discussing will address only one bed leg lifting block 210 within the system 200.

Referring to FIG. 3, an enlarged perspective view of the embodiment of the present invention of FIG. 2, the system 200, with a first bed leg receiving surface facing upwards, is shown. Preferably, the bed leg lifting block 210 provides a first bed leg receiving surface 210a integral to a first side of the bed leg lifting block 210.

Referring to FIG. 4, a perspective view of the embodiment of the present invention of FIG. 2, the system 200, with a second bed leg receiving surface facing upwards is shown. Thus, it is shown that the bed leg lifting block 210 preferably provides the first bed leg receiving surface 210a integral to a first, or top, side of the bed leg lifting block 210, and upon a second, or bottom and opposite, side is the second bed leg receiving surface 210b.

Figure 6:
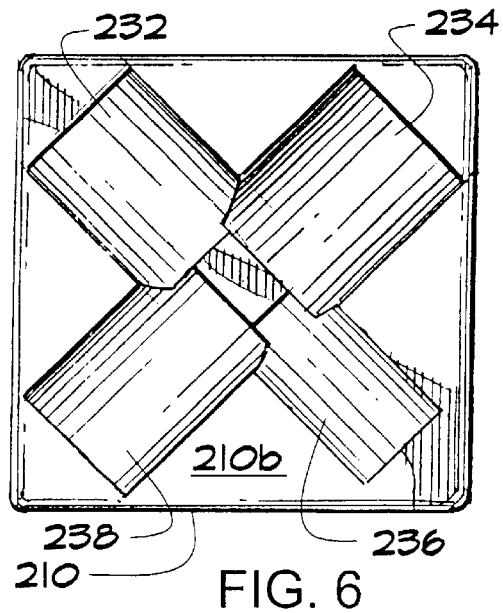
FIG. 6 is an overhead view of the second bed leg receiving surface of the embodiment of the present invention of FIG. 4.

Referring to FIGS. 5 and 6, overhead views of the first bed leg receiving surface 210a and the second bed leg receiving surface 210b of the embodiment of the present invention of FIGS. 2, 3 and 4 are shown respectively. Preferably, both the first bed leg receiving surface 210a and the second bed leg receiving surface 210b comprise a plurality of bed leg receiving cavities integral to them for the receipt of a plurality of bed leg ends, castors, or wheels. Preferably, either the first bed leg receiving surface 210a or the second bed leg receiving surface 210b may be reversely placed so that either such opposed end may act as a bottom support.

Referring to FIG. 5, the first bed leg receiving surface 210a (embodying herein a first such opposed end of such unitary lifter comprises such first plurality of holders) plurality of bed leg receiving cavities provide bore holes 212, 214, 216, and 218, each of substantially different geometries both in depth and diameter (embodying herein a first plurality of respective holders structured and arranged to hold the bed leg in a stable position at a first plurality of respective unique selected heights; and, also embodying herein, each respective one of such first plurality of holders comprises a respective first cavity shaped substantially like a round cylinder; and, each one of such respective first cavities has a different bore depth than each other one of such respective first cavities). Preferably, the bore holes 212, 214, 216, and 218 in an embodiment of the present invention possess approximate depths as set forth in the following chart.

Bore holes integral to the first bed leg receiving surface 210a

| Bore Hole # | Depth |
| --- | --- |
| 214 | ¼ inch |
| 212 | ½ inch |
| 216 | ¾ inch |
| 218 | 1 inch |

Referring to FIG. 6, the second bed leg receiving surface 210b plurality of bed leg receiving cavities preferably provide reverse half cylinders 232, 234, 236, and 238, each of substantially different geometries both in depth and diameter (embodying herein a second plurality of respective holders structured and arranged to hold the bed leg in a stable position at a second plurality of respective unique selected heights). The reverse half cylinders 232, 234, 236, and 238 in this embodiment of the present invention possess depth measurements as set forth in the following chart (this arrangement embodying herein each respective one of such second plurality of holders comprises a respective second cavity shaped substantially like a side portion of a round cylinder; and, each one of such respective second cavities has a different depth than each other one of such respective second cavities).

Reverse half cylinders integral to the second bed leg receiving surface 210b

| Reverse half cylinder # | Depth |
| --- | --- |
| 236 | ¼ inch |
| 238 | ½ inch |
| 232 | ¾ inch |
| 234 | 1 inch |

Figure 7:
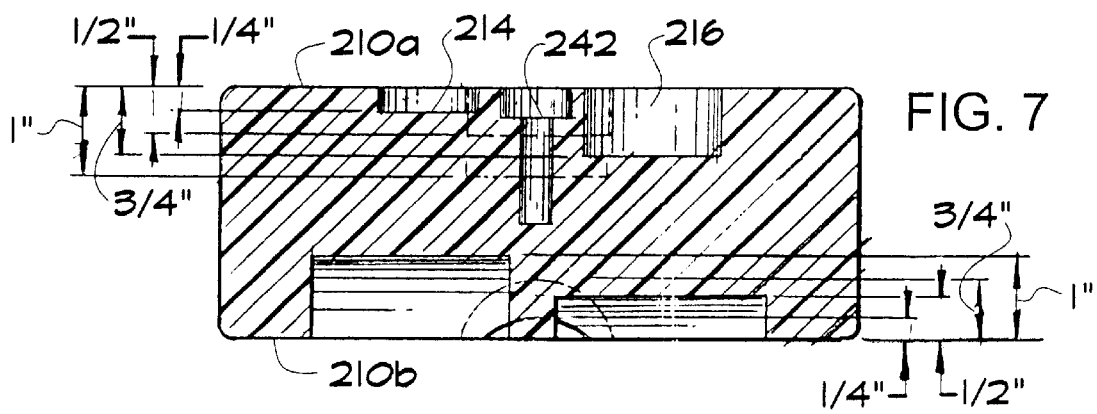
FIG. 7 is a cross-sectional view of the embodiment of the present invention of FIGS. 5 and 6 taken along the line 7—7, and showing the relative depths of a plurality of bed leg receiving cavities.

Referring to FIG. 7, a cross-sectional view of the embodiment of the present invention of FIGS. 5 and 6 taken along the line 7—7, and showing the relative depths of the plurality of bed leg receiving cavities is shown. Preferably, the depths of the bore holes 214, 216, and 218 or the reverse half cylinders 232, 234, 236, and 238 permit a selection in accordance user of the system 200.

The above measurements for the first and second bed leg receiving surfaces 210a and 210b are only examples of some geometrics that may be utilized in an embodiment of the present invention. Those skilled in the art will recognize that many combinations or depths and diameters may be chosen for an embodiment of the present invention without departing from the spirit or scope of the present invention. Those skilled in the art will also recognize a feature of the system 200 in that the plurality of cavities in the first bed leg receiving surface 210a and the second bed leg receiving surface 210b complement each other in terms of their relative depth, i.e. the deepest cavities upon in terms of the first and second receiving surfaces 210a and 210b are not directly opposite each other in order to maintain structural integrity of the system 200 (embodying herein wherein each respective one of such first plurality of holders is opposedly aligned with a selected respective one of such second plurality of holders, selected in such manner as to substantially maximize structural integrity of such unitary lifter). The above described arrangement embodies herein such first plurality of cavities comprises substantially different geometries from such second plurality of cavities.

Figure 8:
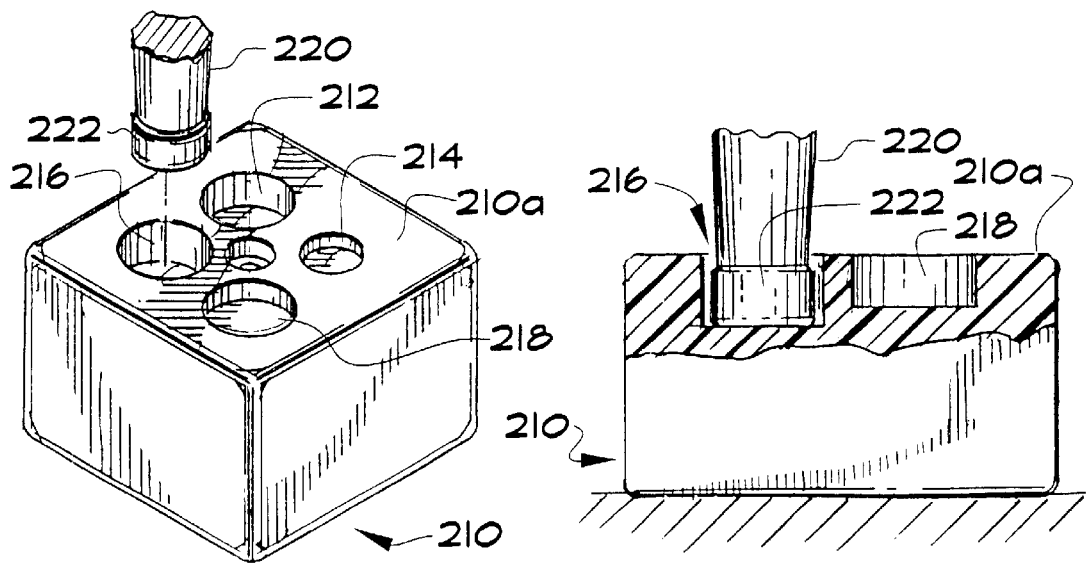
FIG. 8 is a perspective view of the embodiment of the present invention of FIG. 3, viewed from an opposite position relative to the view of FIG. 3., showing a bed leg lifting block, with a first bed leg receiving surface facing upwards, and a peg foot bed leg positioned over a bore hole integral to the first bed leg receiving surface.

Referring to FIG. 8, a perspective view of the embodiment of the present invention of FIG. 3, viewed from an opposite position relative to the view of FIG. 3 is shown. This figure shows a bed leg lifting block 210, with a first bed leg receiving surface 210a facing upwards (embodying herein a first such opposed end of such unitary lifter comprises such first plurality of holders), and a bed leg 220 positioned over a bore hole 216 integral to the first bed leg receiving surface 210a. The bed leg 220 preferably provides a peg foot 222 coupled at the lower end of the bed leg 220. Those skilled in the art will recognize that other variations on bed legs may have a smooth or singular construction of the bed leg and peg foot, which, although not shown herein, are in keeping with the spirit and scope to the present invention.

Figure 9:
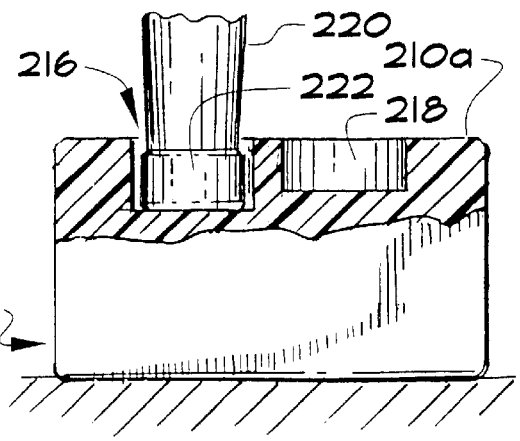
FIG. 9 is an elevational cut-away view of the embodiment of the present invention of FIG. 8 showing the peg foot bed leg positioned into the bore hole integral to the first bed leg receiving surface.

Referring to FIG. 9, shown is an elevational cut-away view of the embodiment of the present invention of FIG. 8 showing the peg foot 222 of the bed leg 220 positioned into the bore hole 216 integral to the first bed leg receiving surface 210a of the bed leg lifting block 210.

Additionally, it should be noted that although the bed leg 220 is shown positioned over the bore hole 216, having a nominal depth of three-quarters of an inch in an embodiment of the present invention, the bed leg could, if desired, be positioned over one of the other bore holes 212, 214, or 218 if a different elevation of the bed 230 is desired.

Referring to FIG. 10, a perspective view of the embodiment of the present invention of FIG. 4, viewed from a position 90° counterclockwise relative to the view of FIG. 4, is shown. This figure shows a bed leg lifting block 210, with a second bed leg receiving surface 210b facing upwards (embodying herein a second such opposed end of such unitary lifter comprises such second plurality of holders), and a bed leg 226 positioned over a reverse half cylinder 238 integral to the second bed leg receiving surface 210b. The bed leg 226 provides a roller wheel 224 coupled at the lower end of the bed leg 226 with a coupling pin 227. Those skilled in the art will recognize that other variations on wheeled or castor type bed leg ends may be utilized that although not shown herein, are in keeping with the spirit and scope to the present invention.

Referring to FIG. 11, an elevational cut-away view of the embodiment of the present invention of FIG. 8 showing the roller wheel 224 coupled to the bed leg 226, and positioned into the reverse half cylinder 238 integral to the second receiving surface 210b of the bed leg lifting block 210, is shown.

Additionally, it should be noted that although the bed leg 226 and roller wheel 224 are shown positioned over the reverse half cylinder 238, having a nominal depth of one-half of an inch in an embodiment of the present invention, the bed leg could if desired be positioned over one of the other reverse half cylinders 232, 234, or 236 if a different elevation of the bed 230 is desired.

Referring to FIG. 12, a perspective view of another embodiment of the present invention comprising a bushing 260 used to adapt and couple a peg foot style bed leg to a bore hole integral to the first bed leg receiving surface is shown. The bushing 260 includes a reduced size bore hole 262 and an outer diameter 264 sized to fit snugly into a bore hole. The bushing 260 may also be selected from among a range of sizes of the inner and outer diameters as desired to enable a desired fit into a bore hole of the first bed leg receiving surface 210a.

Referring to FIG. 13, an elevational cut-away view showing the bushing placed upon a small size peg foot style bed leg, with the bushing inserted into a bore hole integral to the first bed leg receiving surface is shown. A peg foot style bed leg 230 is inserted into a bushing 260 in which the inner diameter 262 of the bushing 260 forms a friction fit about the peg foot style bed leg 230. The outer diameter 264 of the bushing 260 is sized to result in a friction fit when inserted into a bore hole upon the first bed leg receiving surface 210a.

Figure 14:
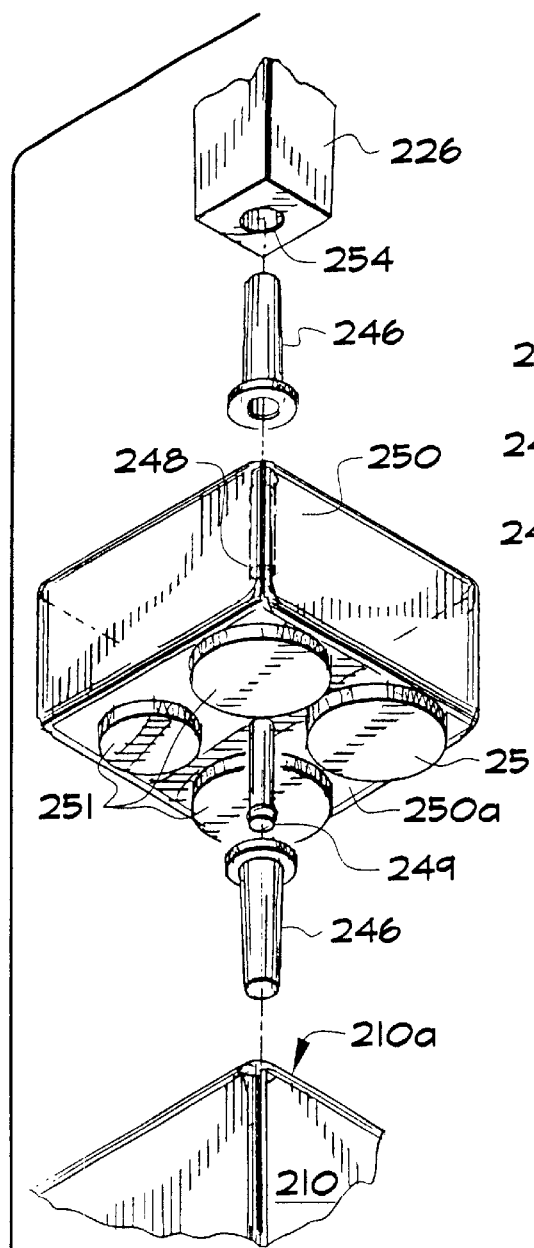
FIG. 14 is an exploded perspective drawing showing an extender block and its coupling bushings used in an alternative embodiment of the present invention, a bed lifting system.

Referring to FIG. 14, an exploded perspective drawing showing an extender block and its coupling bushings used in an alternative embodiment of the present invention is shown. The alternate embodiment includes a bed leg lifting block 210, as in the previous embodiments, having a first bed leg receiving surface 210a. The alternate embodiment further includes an extender block 250 (embodying herein at least one auxiliary lifter structured and arranged to be supported by such unitary lifter and to support such bed leg in a further raised position). The extender block 250 includes a plurality of protrusions 251 upon a first extension block surface 250a of the extension block 250. The plurality of protrusions 251 are configured so as to mate substantially surface to surface with the plurality of bed leg receiving cavities, comprised of the bore holes 212, 214, 216, and 218, integral to the first bed leg receiving surface 210a.

The extender block 250 further includes a mating shaft, or shafts, 248 coupled into the upper and lower surfaces of the extender block 250. The alternate embodiment further includes mating shaft bushings 246. Preferably, the mating shaft bushings 246 are inserted, one each, into a bed leg receiving hole 254 in the end of a bed leg 226, and into a bed leg lifting block receiving hole 242 bored flush with the surface of the first bed leg receiving surface 210a. The bed leg lifting block receiving hole 242 is also shown in FIGS. 3, 5, 7, 13, 15 and 16.

The mating shaft, or shafts, 248 may comprise either a single shaft 248 extending completely through and beyond each upper and lower surface of the extension block 250, or may also comprise two separate mating shafts 248 each being coupled into one of the upper and lower surfaces of the extension block 250.

Figure 15:
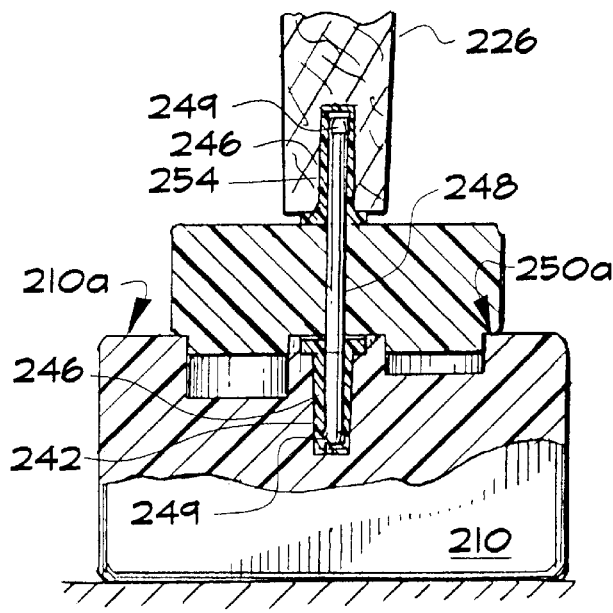
FIG. 15 is an elevational cut-away view of the alternative embodiment of the present invention of FIG. 14.
Figure 16:
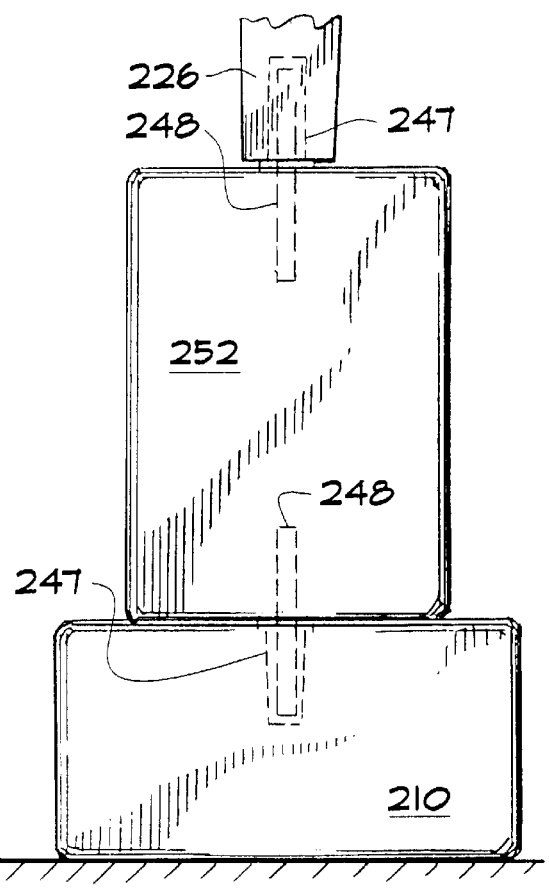
FIG. 16 is an elevational view of a taller embodiment of the alternative embodiment of the present invention of FIG. 14.

Referring to FIG. 15, an elevational cut-away view of the alternative embodiment of the present invention of FIG. 14 is shown. As previously stated, the bed leg 226 preferably includes a bed leg receiving hole 254 bored in its end, into which a bushing 246 is inserted. The mating shaft 248 is in turn preferably inserted into the bushing 246. A second bushing 246 is preferably inserted complete into the bed leg lifting block receiving hole 242 which is preferably manufactured so the upper surface of the bushing 246 is flush with receiving surface 210a. Preferably, the extension block 250 and its mating shaft 248 are inserted down onto the bed leg lifting block 210 until the first bed leg receiving surface 210a is mated flush with the first extension block surface 250a, the plurality of protrusions 251 also mated substantially surface to surface with the bore holes 212, 214, 216, and 218.

Preferably, the mating shaft, or shafts, 248 comprise locking tips 249 that cooperate with the bushings 246 to lock, or snap into place inside the bushings 246 in the manner of conventional leg or wheel inserts known to those skilled in the art. Thus, the alternate embodiment of the extender block 250, the bed leg lifting block 210, and the associated bushings 246 and mating shaft, or shafts, 248 form a substantially solid and stable bed leg lifting block assembly coupled securely to the bed leg 226.

The extender block 250 also preferably includes a variety of heights. For example, referring to FIG. 16, an elevational view of a taller embodiment of the alternative embodiment of the present invention of FIG. 14 is shown. The taller embodiment includes an extender block 252 having substantially identical features to the extender block 250. However, the extender block 252 is used in conjunction with two mating shafts 248 coupled to the upper and lower ends of the extender block 252. Preferably, the mating shafts 248 are threaded into respectively threaded holes 247 in the bed leg lifting block 210 and the extender block 252. The extender block 252 may include a plurality of extension lengths and is not limited herein by the relationship depicted in the Figures.

Figure 17:
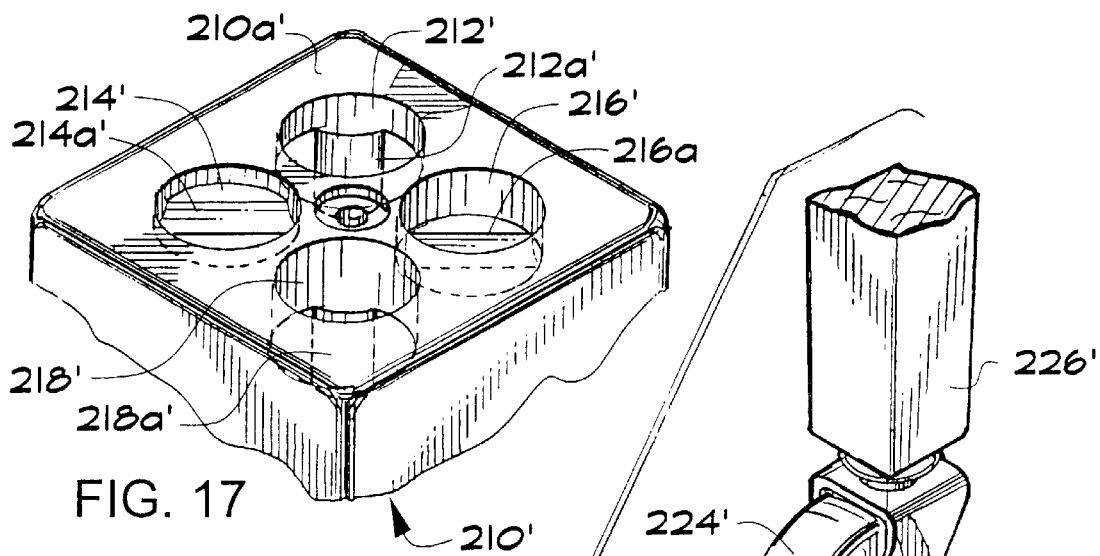
FIG. 17 is a perspective view of a further embodiment of the present invention of FIG. 3, a bed lifting system with an alternative bed leg receiving surface facing upwards.

Referring to FIG. 17, a perspective view of a further embodiment of the present invention of FIG. 2, a bed lifting system 200, a bed lifting system with an alternative bed leg receiving surface facing upwards is shown. The features of this alternative embodiment of the present invention preferably provide substantially identical features as the embodiments of FIGS. 2–16. Thus similar item numbering is used with the exception that the 2xx series of numbers of FIGS. 2–16 are denoted as 2xx' (prime) in FIGS. 17–20.

This alternative embodiment includes a bed leg lifting block 210' which in turn includes a first bed leg receiving surface 210a' integral to a first, or top, side of the bed leg lifting block 210'. The first bed leg receiving surface 210a' preferably includes a plurality of bed leg receiving cavities comprised of bore holes 212', 214', 216', and 218', each of substantially different geometries both in depth and diameter. The bore holes 212', 214', 216', and 218' in an alternate embodiment of the present invention possess depths as set forth in the following chart.

Bore holes integral to the first bed leg receiving surface 210a'

| Bore Hole # | Depth |
| --- | --- |
| 214' | ¼ inch |
| 212' | ½ inch |
| 216' | ¾ inch |
| 218' | 1 inch |

Additionally, the bore holes 212', 214', 216', and 218' each preferably include a wheel receiving groove 212a', 214a', 216a', and 218a' running laterally across a bottom end of each respective bore hole 212', 214', 216', and 218', as shown. Preferably, each of the wheel receiving grooves 212a', 214a', 216a', and 218a' are sized to cooperate with and receive a wheeled bed leg into them. Preferably, the wheels are positioned such that they are longitudinally aligned with the bed corners (e.g. pointed towards the corners of the bed leg lifting block 210'). The purpose of the longitudinal alignment is to keep the bed leg lifting block 210' parallel and flush with the edge of the bed 130, thereby, preferably preventing a users foot from hitting the bed leg lifting block 210'

Figure 18:
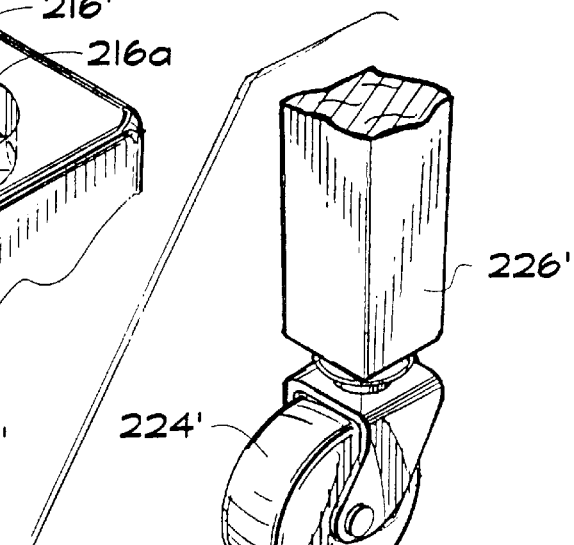
FIG. 18 is a partial perspective view of the embodiment of the present invention of FIG. 17, a bed lifting system, with the alternative bed leg receiving surface facing upwards, showing a wheeled bed leg positioned over a receiving groove in the bottom of a bore hole integral to the alternative bed leg receiving surface.
Figure 19:
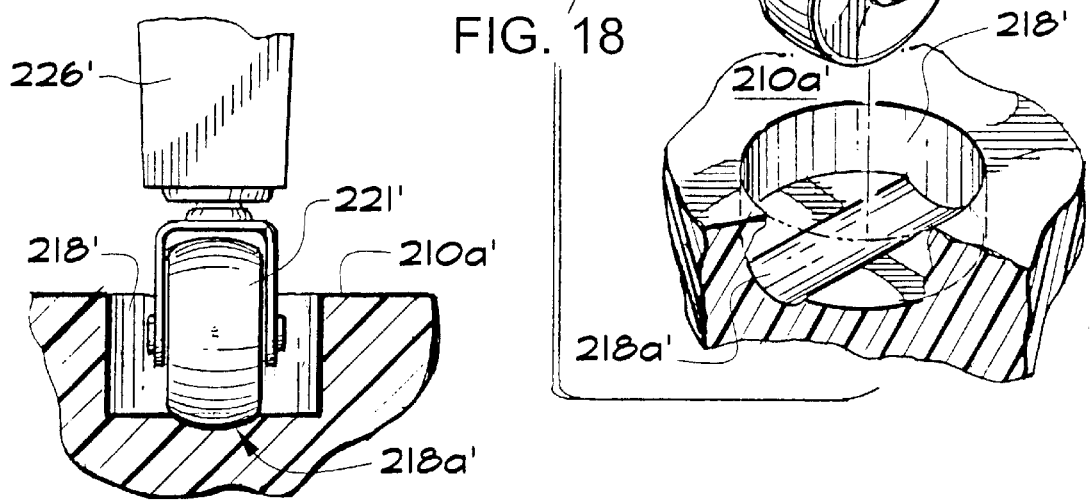
FIG. 19 is an elevational cut-away view of the embodiment of the present invention of FIGS. 17 and 18 showing the wheeled bed leg positioned into the groove in the bottom of the bore hole integral to the alternative bed leg receiving surface.
Figure 20:
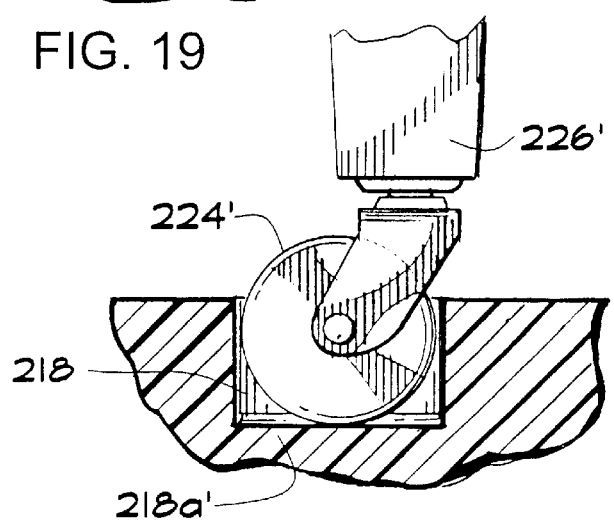
FIG. 20 is an elevational cut-away view of the embodiment of the present invention of FIGS. 17, 18, and 19, viewed from a 90° angle position relative to the view of FIG.

Referring to FIG. 18, a partial perspective view of the embodiment of the present invention of FIG. 17, a bed lifting system, with the alternative bed leg receiving surface 210a' facing upwards, a wheeled bed leg positioned over a receiving groove in the bottom of a bore hole integral to the alternative bed leg receiving surface is shown. Although only one bore hole 218 and its wheel receiving groove 218a' is shown, the explanation thereof is equally applicable to the bore holes 212', 214', and 216', and their respective wheel receiving grooves 212a', 214a', and 216a'. Preferably, a bed leg 226' providing a wheel 224' is positioned with the vertical plane of the wheel 224' over and aligned with the wheel receiving groove 218a' in the bore hole 218'. Referring to FIG. 19, an elevational cut-away view of the embodiment of the present invention of FIG. 17 and 18, there is shown the wheeled bed leg 226' positioned into the wheel receiving groove 218a' in the bottom of the bore hole 218' integral to the alternative bed leg receiving surface 210a'. The wheel receiving groove 218a' preferably provides lateral stability to the wheel 224'. Referring to FIG. 20, an elevational cut-away view of the embodiment of the present invention of FIG. 17, 18 and 19, viewed from a 90° angle position relative to the view of FIG. 19, there is shown the wheel 224' of the bed leg 226' positioned into the wheel receiving groove 218a' in the bottom of the bore hole 218' integral to the alternative bed leg receiving surface 210a'.

Additional features of the present invention include the following. The bed leg lifting block 210 and the extender blocks 250 and 252 may provide any suitably sound material having sufficient structural strength for the elevation of a bed having its bed legs supported upon the bed leg lifting block 210 and the extender blocks 250 and 252. For example, the bed leg lifting block 210 and the extender blocks 250 and 252 may be provided of wood, molded or machined plastics, molded or machined metals, molded or machined composites, etc. Furthermore, although not shown herein, the bed leg lifting block 210 and the extender blocks 250 and 252 may be provided of colors upon their surfaces as desired, and may further provides artistic decoration or indicia upon the outer facing surfaces. Yet a further feature of embodiments of the present invention is that the bed leg lifting block 210 and the extender blocks 250 and 252 of the system 200 may be stored beneath a bed 230 thus keeping them out of the way while maintaining easy access for a user.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A bed lifting system elevating a bed leg to a selectable height above a floor comprising, in combination:
  a) unitary lifter, having opposed top and bottom ends, structured and arranged to support the bed leg in a raised position above the floor; and
  b) a first plurality of holders structured and arranged to hold the bed leg in a stable position at a first plurality of respective unique selected heights;
  c) wherein said first plurality of holders comprises said unitary lifter;
  d) wherein said first plurality of holders comprises a plurality of unique holder depths;
  e) wherein said first plurality of holders are non-concentric;
  f) wherein said first plurality of holders comprise a single substantially planar upper surface;
  g) and a bed leg being positioned within one of said holders.

2. The bed lifting system according to claim 1 wherein a first said opposed end of said unitary lifter comprises said first plurality of holders.

3. The bed lifting system according to claim 2 further comprising:
   a) a second plurality of respective holders structured and arranged to hold the bed leg in a stable position at a second plurality of respective unique selected heights;
   b) wherein a second said opposed end of said unitary lifter comprises said second plurality of holders; and
   c) wherein said opposed ends of said unitary lifter may be reversely placed so that either said opposed end may act as a bottom support.

4. The bed lifting system according to claim 3 wherein each respective one of said first plurality of holders is opposedly aligned with a selected respective one of said second plurality of holders, selected in such manner as to substantially maximize structural integrity of said unitary lifter.

5. The bed lifting system according to claim 3 wherein:
   a) each respective one of said first plurality of holders comprises a respective first cavity comprising a round cylinder shape; and
   b) each one of said respective first cavities has a different bore depth than each other one of said respective first cavities.

6. A bed lifting system for elevating a bed leg to a selectable height above a floor comprising, in combination:
   a) a unitary lifter, having opposed top and bottom ends, structured and arranged to support the bed leg in a raised position above the floor; and
   b) a first plurality of respective holders structured and arranged to hold the bed leg in a stable position at a first plurality of respective unique selected heights;
   c) wherein said first plurality of holders comprises said unitary lifter;
   d) wherein a first said opposed end of said unitary lifter comprises said first plurality of holders; and
   e) a second plurality of respective holders structured and arranged to hold the bed leg in a stable position at a second plurality of respective unique selected heights;
   f) wherein a second said opposed end of said unitary lifter comprises said second plurality of holders; and
   g) wherein said opposed ends of said unitary lifter may be reversely placed so that either said opposed end may act as a bottom support;
   h) wherein each respective one of said second plurality of holders comprises a respective second cavity comprising a side portion of a round cylinder; and
   i) wherein each one of said respective second cavities has a different depth than each other one of said respective second cavities.

7. A bed lifting system according to claim 1 further comprising:
   a) at least one auxiliary lifter structured and arranged to be supported by said unitary lifter and to support said bed leg in a further raised position.

8. A bed lifting system having a plurality of receiving surfaces and bed leg receiving cavities, comprising, in combination:
   a) at least one bed leg;
   b) at least one bed leg lifting block having a substantially planar upper surface;
   c) a first receiving surface integral to a first side of said bed leg lifting block; and
   d) a first plurality of bed leg receiving cavities, each cavity adapted to receive said at least one bed leg, integral to said first receiving surface;
   e) wherein each of said first plurality of bed leg receiving cavities comprises a unique depth from said first receiving surface;
   f) wherein said first plurality of bed leg receiving cavities are non-concentric.

9. The bed lifting system of claim 8 further comprising:
   a) a second receiving surface integral to a second side, opposite said first side, of said bed leg lifting block; and
   b) a second plurality of bed leg receiving cavities integral to said second receiving surface;
   c) wherein each of said second plurality of bed leg receiving cavities comprises a unique depth from said second receiving surface.

10. The bed lifting system of claim 9 wherein said first plurality of cavities comprises substantially different geometries from said second plurality of cavities.

11. A bed lifting system having a plurality of receiving surfaces and bed leg receiving cavities, comprising, in combination:
    a) at least one bed leg lifting block;
    b) a first receiving surface integral to a first side of said bed leg lifting block; and
    c) a first plurality of bed leg receiving cavities integral to said first receiving surface;
    d) wherein each of said first plurality of bed leg receiving cavities comprises a unique depth from said first receiving surface;
    e) a second receiving surface integral to a second side, opposite said first side, of said bed leg lifting block; and
    f) a second plurality of bed leg receiving cavities integral to said second receiving surface;
    g) wherein each of said second plurality of bed leg receiving cavities comprises a unique depth from said second receiving surface;
    h) wherein said first plurality of cavities comprises substantially different geometries from said second plurality of cavities;
    i) wherein each of said second plurality of bed leg receiving cavities comprises a reverse partial cylinder structured and arranged to stably support the bottom of a bed roller wheel, wherein the axis of said reverse partial cylinder is coplanar with the second receiving surface.

12. The bed leg lifting system of claim 11 wherein each of said first plurality of bed leg receiving cavities comprises a round cylindrical bore hole.

13. The bed leg lifting system of claim 12 further comprising at least one bushing structured and arranged so that an outer diameter of said bushing comprises a friction fit into at least one said round cylindrical bore hole.

14. The bed leg lifting system of claim 12 wherein each said bore hole comprises a wheel-receiving groove running laterally across a bottom end of said bore hole.

15. The bed leg lifting system of claim 12 further comprising at least one extension block structured and arranged to stably support the bed leg on a first block surface and to be stably supported on an opposed second block surface by one said bed lifting block.

16. The bed leg lifting system of claim 15 wherein:
    a) said extension block comprises a plurality of protrusions upon said first block surface of said extension block; and
    b) said plurality of said protrusions are configured so as to mate substantially surface-to-surface with said first plurality of bed leg receiving cavities integral to said first receiving surface.

17. The bed leg lifting system of claim 16 wherein said extension block has a dimension, between said first block surface of said extension block and said second opposed block surface, which is less than a corresponding measured dimension between said first side and said second side of said bed lifting block.

18. The bed leg lifting system of claim 15 wherein said extension block has a dimension, between said first block surface of said extension block and said second opposed block surface of said extension block, wherein said dimension is greater than a corresponding measured dimension between said first side and said second side of said bed lifting block.

19. The bed leg lifting system of claim 15 wherein:
   a) said extension block comprises a male attachment structure extending from at least one surface of said extension block;
   b) said bed lifting block comprises at least one female attachment structure on at least one surface of said bed lifting block; and
   c) said male attachment structure and said female attachment structure are structured and arranged to provide, when connected, a substantially secure connection between said extension block and said bed lifting block.

20. The bed leg lifting system of claim 12 wherein each of said first plurality of cavities comprises a wheel-receiving groove running laterally across a bottom end of each of said first plurality of cavities, each said wheel-receiving groove being aligned so that an extension of said wheel-receiving groove would pass through a center point of said second side.

* * * * *